United States Patent
Chen et al.

(10) Patent No.: US 8,164,291 B2
(45) Date of Patent: Apr. 24, 2012

(54) CONTROL APPARATUS FOR STARTING A DIRECT CURRENT BRUSHLESS MOTOR AND METHOD THEREOF

(75) Inventors: Hsuan-Chuan Chen, Chupei (TW); Teng-Tsai Lin, Chupei (TW)

(73) Assignee: Feeling Technology Corp., Chupei, Hsinchu County (TW)

( * ) Notice: Subject to any disclaimer, the term of this patent is extended or adjusted under 35 U.S.C. 154(b) by 748 days.

(21) Appl. No.: 12/345,152

(22) Filed: Dec. 29, 2008

(65) Prior Publication Data

US 2009/0179603 A1    Jul. 16, 2009

(30) Foreign Application Priority Data

Jan. 15, 2008  (TW) .............................. 97101497 A

(51) Int. Cl.
 *H02P 6/00* (2006.01)
(52) U.S. Cl. ......... 318/400.32; 318/400.33; 318/400.34; 318/400.35
(58) Field of Classification Search ............ 318/400.32, 318/400.33, 400.34, 400.35
See application file for complete search history.

(56) References Cited

U.S. PATENT DOCUMENTS

| | | | | |
|---|---|---|---|---|
| 5,182,499 A * | 1/1993 | Inaji et al. | ................. | 318/400.17 |
| 5,245,256 A * | 9/1993 | Cassat et al. | ............. | 318/400.35 |
| 5,327,053 A * | 7/1994 | Mann et al. | .............. | 318/400.35 |
| 5,343,127 A * | 8/1994 | Maiocchi | ................. | 318/400.11 |
| 5,969,491 A * | 10/1999 | Viti et al. | ................. | 318/400.35 |
| 6,023,141 A * | 2/2000 | Chalupa | ................... | 318/400.35 |
| 7,071,640 B2 * | 7/2006 | Kurosawa et al. | ........ | 318/400.04 |
| 7,859,208 B2 * | 12/2010 | Ayre et al. | ................ | 318/400.13 |
| 7,888,897 B2 * | 2/2011 | Murai | ........................ | 318/400.06 |
| 2002/0140395 A1 * | 10/2002 | Tazawa et al. | ................ | 318/727 |

* cited by examiner

*Primary Examiner* — Walter Benson
*Assistant Examiner* — Thai Dinh
(74) *Attorney, Agent, or Firm* — Thomas, Kayden, Horstemeyer & Risley, LLP

(57) ABSTRACT

An apparatus for starting a direct current brushless motor and a method thereof are provided. The direct current brushless motor comprises a plurality of windings. The control apparatus comprises a sense amplifier, a differential circuit, and a control circuit. The sense amplifier is configured to detect a first back electro-motive force of a non-electrified first winding. The differential circuit is configured to calculate a differential value of the first back electro-motive force. The control circuit is configured to provide a current to two of the windings and to switch the current to another two of the windings to start the direct current brushless motor.

9 Claims, 4 Drawing Sheets

CONTROL APPARATUS FOR STARTING A DIRECT CURRENT BRUSHLESS MOTOR AND METHOD THEREOF

This application claims the benefit of priority based on Taiwan Patent Application No. 097101497 filed on Jan. 15, 2008, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a control apparatus for starting a direct current (DC) brushless motor and a method thereof. More specifically, the present invention relates to a control apparatus for starting a DC brushless motor without a sensor and a method thereof.

2. Descriptions of the Related Art

In detecting the correct position of a rotor in a DC brushless motor during the start-up period, the conventional practice is to place a sensor (e.g., a Hall sensor) within the motor. The sensor is configured to sense the variation of the magnetic field between the rotor and the sensor when the motor is running to obtain information about the rotor position. However, the Hall sensor needs to be placed into the motor module with a precise position, which makes it difficult during assembly and increases production costs in small motors.

In an attempt to decrease the assembly difficulties and the production costs of small motors, DC brushless motors have been developed without sensors and have been used in various products that require drives. Generally, for most motors, the speed thereof can be well controlled when running at a medium or high rotational speed. However, in a stationary state, it is difficult to detect the rotor position. As a result, a particular starting procedure must be implemented to ensure that the motor can be started up in the normal driving mode.

Many conventional technologies used to start a DC brushless motor without a sensor have already been proposed, such as U.S. Pat. No. 5,343,127 and U.S. Pat. No. 7,202,623. According to both U.S. patents, a back electromotive force (BEMF) generated across the rotor winding in response to the rotational movement thereof is detected as the reference for determining the rotor position to start the motor. Unfortunately, these technologies require complex operations to start the motor, causing increased difficulties in controlling the motor.

Accordingly, it is highly desirable in the art to provide a control method and a circuit thereof that eliminates the need of a sensor and complex operational procedures while still appropriately starting a DC brushless motor.

SUMMARY OF THE INVENTION

One objective of the present invention is to provide a method for starting a direct current (DC) brushless motor. The DC brushless motor comprises a plurality of windings jointly connected to each other through a joint juncture. The method comprises the following steps of: exciting a first phase by supplying a current to the first and second windings; measuring a first back electromotive force (BEMF) of a third winding that has not conducted current through yet; calculating a differential value of the first BEMF; switching to a second phase by switching the current to the second winding and the third winding according to the differential value and in response to a start-time period; measuring a second BEMF of the first winding; and switching to a third phase by switching the current to the first winding and the third winding when the second BEMP crosses a negative zero-crossing point.

Another objective of the present invention is to provide a control apparatus for starting a DC brushless motor. The DC brushless motor comprises a plurality of windings. The control apparatus comprises a sense amplifier, a differential circuit and a control circuit. The sense amplifier is coupled to the windings and configured to measure a first BEMF of a first non-electrified winding that has not conducted current through yet to generate an output signal. The differential circuit is coupled to the sense amplifier, and configured to receive the output signal from the sense amplifier and to calculate a differential value of the first BEMF to generate an output signal. The control circuit is coupled to the sense amplifier, the differential circuit, and the windings. The control circuit is also configured to receive the output signal of the sense amplifier and the output signal of the differential circuit respectively for supplying a current to two of the windings to excite a first phase, and to switch the current to the other two windings in a specific sequence according to the differential value and start time period to start the DC brushless motor.

According to the present invention, by supplying a current to two of the windings of the DC brushless motor, the DC brushless motor will rotate and generate a BEMF in the other winding. Then, in response to a variation in a differential value of the BEMF generated when the motor rotates by a steady-state equilibrium point, the current is switched to the other two windings to ensure successful running of the motor. In this way, a complex operational procedure to start the motor is no longer needed.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, embodiments will be described to explain the present invention, which provides a method for starting a DC brushless motor. This method supplies a current to two of the windings of the DC brushless motor. Then, in response to the variation in the differential value of the BEMF generated when the motor rotates by a steady-state equilibrium point, the current is switched to the other two windings to ensure a running motor. In this way, the shortcoming of a complex operational procedure in the prior art is eliminated. However, these embodiments are not intended to limit the present invention to any specific context, application or particular implementation described in these embodiments. Therefore, these embodiments are described only for purpose of illustration but not limitation. It should be understood that elements indirectly related to the present invention are omitted from illustration in the following embodiments and the attached drawings. In addition, dimensional relationships among individual elements are only illustrated to facilitate understanding rather than to limit the actual scales.

Figure 1:
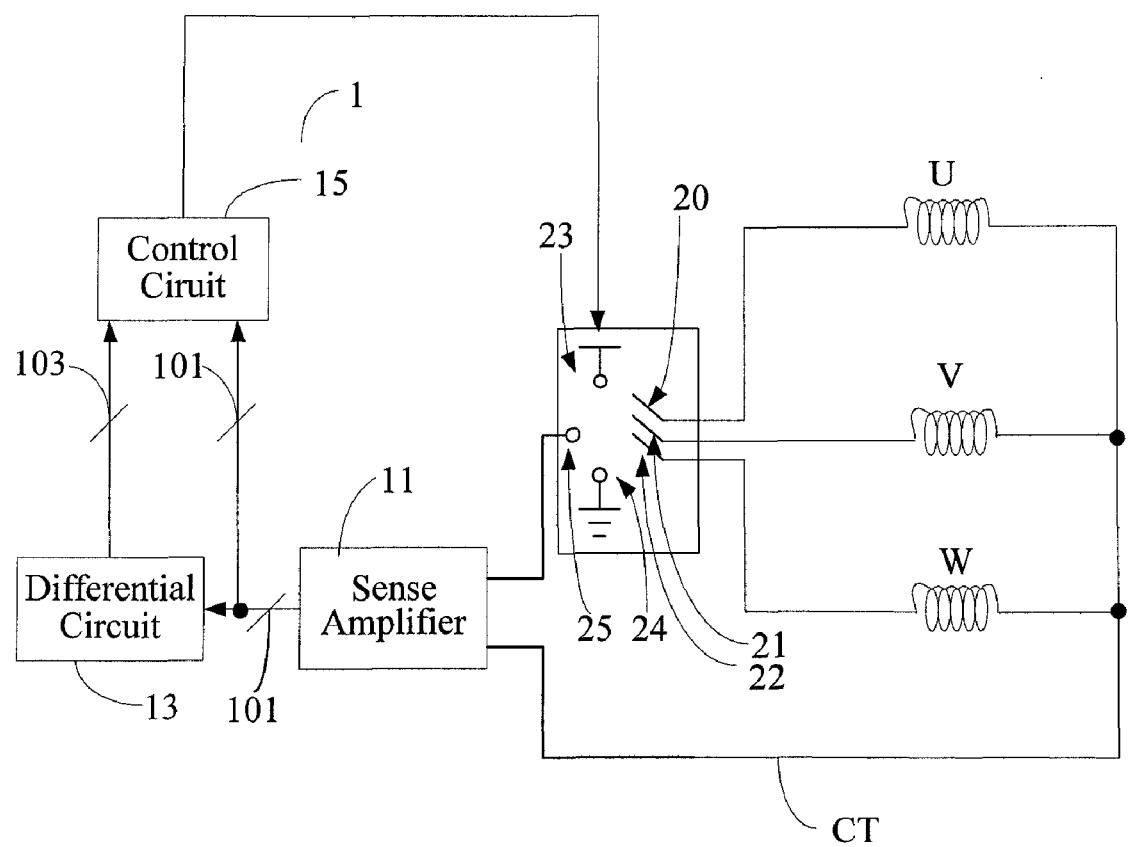
FIG. 1 is a schematic view of a first preferred embodiment of the present invention.

A first preferred embodiment of the present invention is illustrated in FIG. 1, which is a schematic view illustrating the connections between a control apparatus 1 and internal windings of a DC brushless motor comprising a plurality of windings. The control apparatus 1 is configured to start the DC brushless motor. In this preferred embodiment, the DC brushless motor is a three-phase motor comprising a winding U, a winding V and a winding W with a central tap CT. It should be noted that the number of windings in the motor is not intended to limit the present invention; rather, the present invention is applicable to DC brushless motors with three or more windings.

The control apparatus 1 comprises a sense amplifier 11, a differential circuit 13 and a control circuit 15. The control circuit 15, which is coupled to the windings, is configured to supply a current to two of the windings to excite a first phase. In this embodiment, the control circuit 15 modulates the power supplied to the windings by controlling the switch elements 20, 21 and 22 disposed between the windings U, V, W and the power supply. The sense amplifier 11, which is coupled to the windings, is configured to measure a first BEMF across the non-energized first winding and generate an output signal 101. The differential circuit 13, which is coupled to the sense amplifier 11, is configured to receive the output signal 101 from the sense amplifier 11 and to calculate a differential value of the first BEMF to generate an output signal 103. The control circuit 15 is coupled to the sense amplifier 11, the differential circuit 13 and the windings. The control circuit 15 is configured to receive the output signals 101, 103 from the sense amplifier 11 and the differential circuit 13 respectively, supply a current to two of the windings to excite a first phase, and then switch the current to the other two windings in a specific sequence according to the differential value and start time period to start the DC brushless motor.

The control circuit 15 further comprises a delay circuit (not shown) configured to generate a delay time. A span of the delay time is adapted to prevent a false differential value of a BEMF that crosses the positive zero-crossing point. By using the differential value of the first BEMF and in response to the start time period, the control circuit 15 switches the current to another set of two windings to switch to a second phase. In more detail, the control circuit 15 determines if a positive zero-crossing occurs to the differential value of the first BEMF in the start time period. If so, the current is switched to another set of two windings to switch to a second phase. Otherwise, the current is switched to another set of two windings after the start time period to switch to a second phase.

Subsequent to the switching to the second phase, the sense amplifier 11 measures a second BEMF across a non-energized second winding. The control circuit 15 then determines if the negative zero-crossing occurs in the second BEMF, to switch the current to another set of two windings to switch to the third phase.

Figure 2:
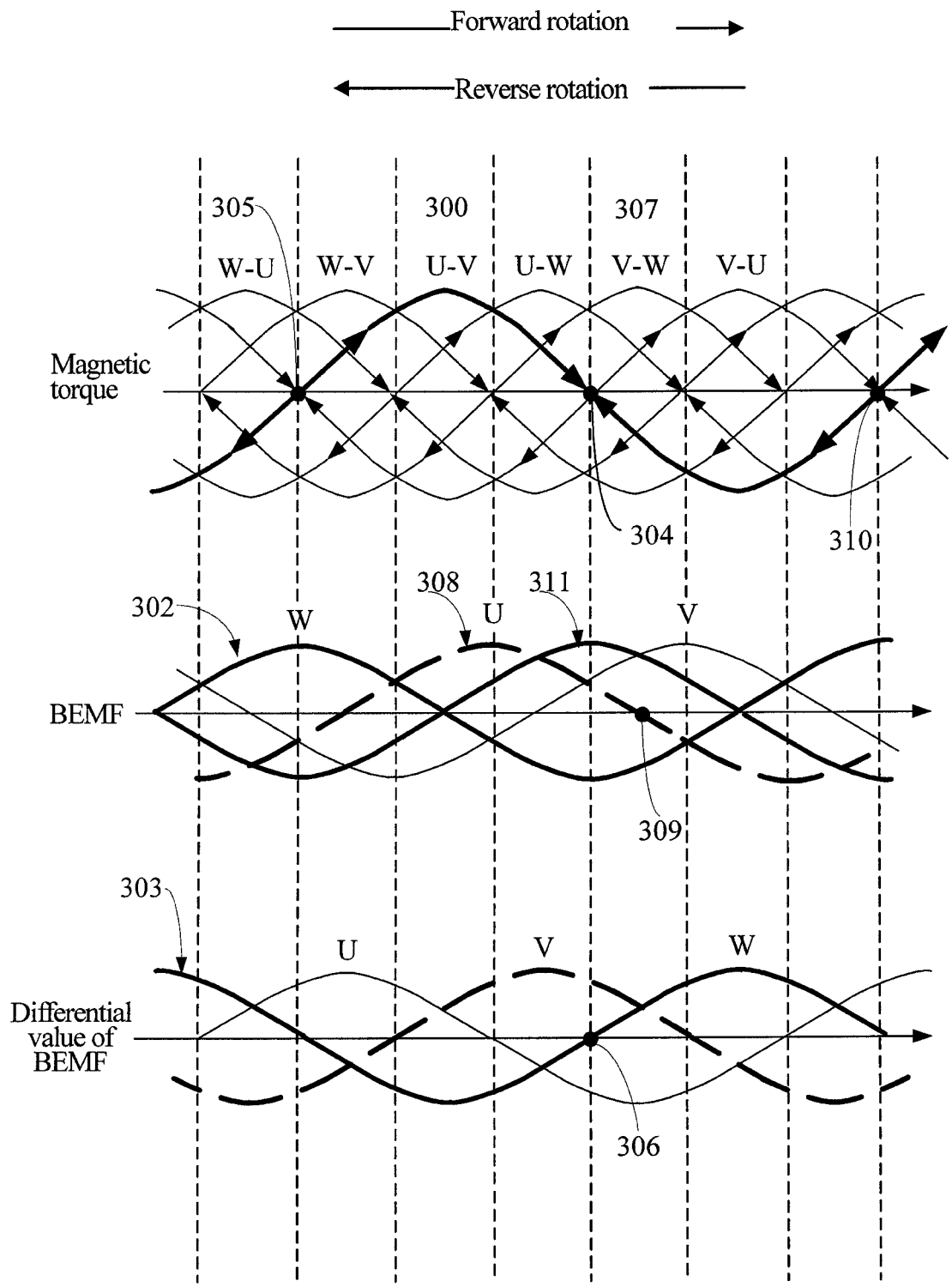
FIG. 2 is a magnetic torque-BEMF waveform diagram of the present invention.

FIG. 2 is provided to more clearly illustrate how the control apparatus 1 starts the DC brushless motor. FIG. 2 is a magnetic torque-BEMF waveform diagram including waveforms of the magnetic torque, the BEMF and the differentiated BEMF. Using the windings U, V as an example, the switch elements 20, 21 are coupled to the power supply terminal 23 and the ground terminal 24 of the control apparatus 1 respectively. The central tap is coupled to the sense amplifier 11 to complete a circuit. Then, the control circuit 15 supplies a current to the windings U, V via the power supply terminal 23 to excite a U-V phase 300 (i.e., the first phase) to allow the control apparatus 1 to start the DC brushless motor between an unsteady-state equilibrium point 305 and a steady-state equilibrium point 304 of the curve 301. That is, once the rotor rotates to the steady-state equilibrium point 304, it will come to a standstill and cease to rotate at the steady-state equilibrium point 304. The present invention thus drives a DC brushless motor by virtue of aforementioned characteristic. The magnetic torque of the U-V phase 300 is denoted as a curve 301. The switch element 22 is coupled to the input terminal 25 such that no current would flow in the winding W. In other words, the first BEMF (i.e., a curve 302) will be generated across the winding W in response to the rotation of the rotor in the forward direction, and a differential value of the first BEMF is shown as a curve 303.

In particular, the sense amplifier 11 is configured to detect the curve 302 of the first BEMF to generate an output signal 101. The differential circuit 13 is configured to detect the curve 303 of the differential value of the first BEMF to generate an output signal 103. The output signal 101 and the output signal 103 represent the first BEMF and the differential value thereof respectively, which are provided to the control circuit 15 for determination.

When the curve 301 reaches the steady-state equilibrium point 304, the curve 303 of the differential value of the first BEMF crosses the positive zero-crossing point 306. In other words, as long as the curve 303 crosses the positive zero-crossing point 306 within the start time period, the control circuit 15 can determine that the magnetic torque of the windings U, V reaches the steady-state equilibrium point 304, where the current must be switched to the V-W phase 307 (i.e., the second phase). Additionally, if the differential circuit 13 does not detect the curve 303 which crosses the positive zero-crossing point 304 within the start time period, i.e., the DC brushless motor has already stayed at the steady-state equilibrium point 304 right before it is started, the control circuit 15 will also switch the current to the V-W phase 307 (i.e., the second phase) after the start time period has elapsed.

Once the current is switched to the V-W phase 307, i.e., the windings V and W are energized while the winding U is not, the measurement circuit amplifier 11 will detect a BEMF curve 308 across the winding U (i.e., the second BEMF). In this case, the control circuit 15 will determine if a negative zero-crossing 309 occurs in the BEMF curve 308. If so, the current is switched to the windings V, U so that the motor enters into a normal driving mode upon operation. It should be noted that in this preferred embodiment, the control apparatus 1 starts the DC brushless motor in a period between the unsteady-state equilibrium point 305 and the steady-state equilibrium point 304. However, in other preferred embodiment, the control apparatus 1 may also start the DC brushless motor in a period between the unsteady-state equilibrium point 310 and the steady-state equilibrium point 304, which will be briefed as follows.

Due to the magnetic torque between the points 310 and 304 of the curve 301, the rotor will be rotated in the reverse direction, in which case the sense amplifier 11 will detect the first BEMF (i.e., the curve 311) in the reverse direction across the non-energized winding W. Because the rotor is now rotating in the reverse direction, the differential value of the first BEMF can also be denoted by the curve 303. While the rotor is rotating to the steady-state equilibrium point 304, the curve 303 crosses the positive zero-crossing point 306 in the negative direction. In addition, upon crossing the steady-state equilibrium point 304, the rotor will be reversed to the forward rotation direction due to the magnetic torque curve 301. Then, the curve 303 crosses the positive zero-crossing point 306 in the positive direction instead.

Furthermore, when the curve 303 crosses the positive zero-crossing point 306 within the start time period, the control circuit 15 can determine that the magnetic torque of the windings V, U reaches the steady-state equilibrium point 304, in which case the current must be switched to the V-W phase 307. Subsequently, the control circuit 15 will determine if a negative zero-crossing 309 occurs on the BEMF curve 308 of the winding U. If so, the current is switched to the windings V, U so that the motor enters into the normal driving mode upon operation.

As shown in FIG. 2, it is also possible for the rotor of the DC brushless motor in the stationary state to already be at the steady-state equilibrium point 304, in which case exciting the U-V phase 300 will not rotate the rotor. Therefore, if no positive zero-crossing occurs to the differential value curve of the first BEMF within the start time period, the control circuit 15 will switch the current to the windings V, W to switch to the V-W phase 307, to continue the aforementioned operations.

With the above arrangement of the present invention by supplying a current to two of the windings of the DC brushless motor, the DC brushless motor is rotated to excite the BEMF in the other winding. Then, in response to the variation in the differential value of the BEMF generated when the motor rotates to the steady-state equilibrium point, the current is switched to another set of two windings to ensure the running of the motor. In this way, a complex operational procedure that was required to start motors of the conventional technique is effectively eliminated.

Figure 3A:
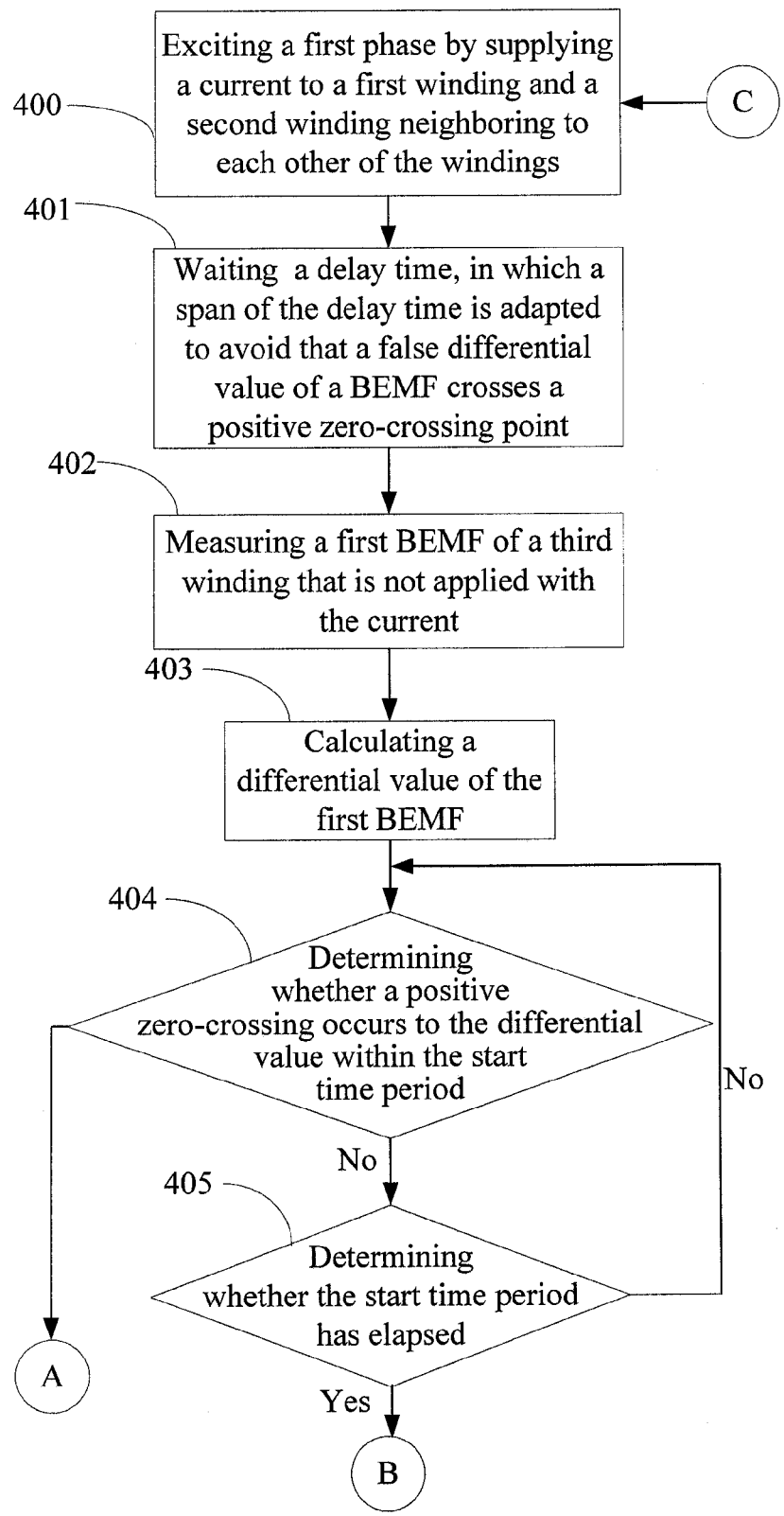
FIG. 3A is a partial flowchart of a second preferred embodiment of the present invention.
Figure 3B:
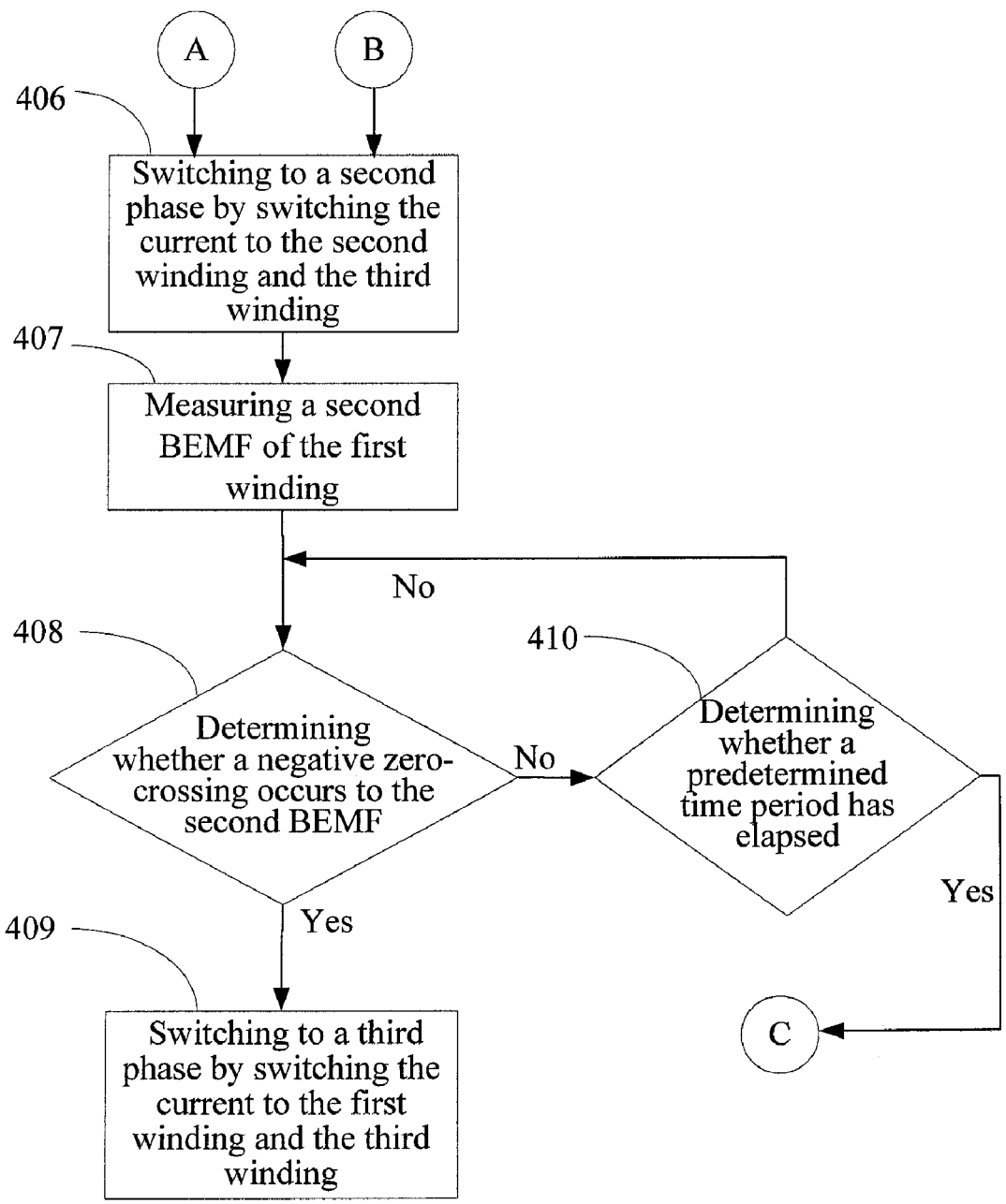
FIG. 3B is another partial flowchart of the second preferred embodiment of the present invention.

A second preferred embodiment of the present invention is illustrated in FIGS. 3A and 3B, both of which illustrate a flow chart of a method for starting a DC brushless motor. The DC brushless motor comprises a plurality of windings jointly connected to each other through a joint juncture. This method comprises the following steps. Initially, referring to FIG. 3A, step 400 is executed to excite a first phase by supplying a current to the first and second windings. Then, step 401 is executed to set a delay time to prevent false differential values of the BEMF from crossing the positive zero-crossing point.

Next, step 402 is executed to measure a first BEMF of a third winding that is not applied with the current, and step 403 is executed to calculate a differential value of the first BEMF. Then, in step 404, it is determined whether a positive zero-crossing occurs to the differential value within the start time period. If not, step 405 is executed to determine whether the start time period has elapsed. If the start time period has not elapsed, then step 404 is executed over again.

As shown in FIG. 3B, if the answer is yes in step 404 or step 405, step 406 is executed to switch to a second phase by switching the current to the second winding and the third winding. More specifically, as a result of steps 404, 405 and 406, the current is switched to the second winding and the third winding according to the differential value and start time period to switch to the second phase. Next, step 407 is executed to measure a second BEMF of the first winding, and step 408 is executed to determine whether the negative zero-crossing occurs in the second BEMF. If so, then step 409 is executed to switch to a third phase by switching the current to the first winding and the third winding. Otherwise, step 410 is executed to determine whether the predetermined time period has elapsed. If the predetermined time period has not elapsed, the process returns back to step 408 to repeat the determining step. Otherwise, the process returns back to step 400 to supply a current to the first and second windings to excite the first phase over again.

In addition to the steps illustrated in FIGS. 3A and 3B, the second preferred embodiment may also execute all the operations and functionalities of the first preferred embodiment. Those of ordinary skill in the art may readily understand how the second preferred embodiment executes these operations and functionalities based on the descriptions of the first preferred embodiment. Thus, this will not be further described again herein.

The above disclosure is related to the detailed technical contents and inventive features thereof. People skilled in this field may proceed with a variety of modifications and replacements based on the disclosures and suggestions of the present invention as described without departing from the characteristics thereof. Nevertheless, although such modifications and replacements are not fully disclosed in the above descriptions, they have substantially been covered in the following claims as appended.

What is claimed is:

1. A method for starting a direct current (DC) brushless motor, the DC brushless motor comprising a plurality of windings jointly connected to each other through a joint juncture, the method comprising the following steps of:
   (a) exciting a first phase by supplying a current to the windings at a first winding and a second winding thereof;
   (b) measuring a first back electromotive force (BEMF) of a third winding that has not conducted the current through yet;
   (c) calculating a differential value of the first BEMF;
   (d) switching to a second phase by switching the current to the second winding and the third winding according to the differential value and in response to a start-time period;
   (e) measuring a second BEMF of the first winding; and
   (f) switching to a third phase by switching the current to the first winding and the third winding while the second BEMF crosses a negative zero-crossing point.

2. The method as claimed in claim 1, before step (b) is executed, further comprising a step of: waiting a delay time, wherein the length of the delay time is adapted enough to avoid that a false differential value of a BEMF crosses the positive zero-crossing point.

3. The method as claimed in claim 1, wherein the step (d) is executed to, in the start time period, switch to the second phase while the differential value crosses a positive zero-crossing point.

4. The method as claimed in claim 1, wherein the step (d) is executed to switch to the second phase after the start time period, while the differential value does not cross a positive zero-crossing point in the start time period.

5. A control apparatus for starting a DC brushless motor, the DC brushless motor comprising a plurality of windings, the control apparatus comprising: a sense amplifier being coupled to the windings and configured to measure a first BEMF of a first non-electrified winding that has not conducted current through yet to generate an output signal; a differential circuit being coupled to the sense amplifier, and configured to receive the output signal of the sense amplifier and to calculate a differential value of the first BEMF to generate an output signal; and a control circuit being coupled to the sense amplifier, differential circuit, and the windings, being configured to receive the output signal of the sense amplifier and the output signal of the differential circuit respectively to supply a current to two of the windings to excite a first phase, and to switch the current to another set of two windings thereof in a specific sequence according to the differential value and a start time period, so as to start the DC brushless motor.

6. The control apparatus as claimed in claim 5, wherein the control circuit is configured to switch the current to another set of two windings thereof to switch to a second phase according to the differential value of the first BEMF and in response to the start-time period, the sense amplifier is configured to measure a second BEMF of a second non-electrified winding that has not conducted current through yet, the control circuit is configured to switch the current to another set of two windings thereof to switch to a third phase while the second BEMF crosses a negative zero-crossing point.

7. The control apparatus as claimed in claim 6, wherein the control circuit further comprises a delay circuit configured to generate a delay time, the length of the delay time is adapted enough to avoid that a false differential value of a BEMP crosses the positive zero-crossing point.

8. The control apparatus as claimed in claim 5, wherein the control circuit, in the start time period, switches the current to the windings at other two windings thereof to switch to a second phase while the differential value of the first BEMF crosses a positive zero-crossing point.

9. The control apparatus as claimed in claim 5, wherein the control circuit switches the current to another set of two windings thereof to switch to a second phase after the start time period, while the differential value of the first BEMF does not cross a positive zero-crossing point in the start time period.

* * * * *